United States Patent
Luss et al.

(10) Patent No.: US 7,061,869 B2
(45) Date of Patent: Jun. 13, 2006

(54) APPARATUS AND METHOD FOR GRACEFUL REASSIGNMENT OF OUT-OF-KILTER COMMUNICATIONS PATHS

(75) Inventors: Hanan Luss, Marlboro, NJ (US); Richard T. Wong, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 925 days.

(21) Appl. No.: 10/091,267

(22) Filed: Mar. 5, 2002

(65) Prior Publication Data

US 2003/0169685 A1 Sep. 11, 2003

(51) Int. Cl.
- H04J 1/16 (2006.01)
- H04J 3/14 (2006.01)
- H04L 12/26 (2006.01)
- H04L 12/28 (2006.01)
- G06F 9/46 (2006.01)

(52) U.S. Cl. .................. 370/238; 370/351
(58) Field of Classification Search ........... 370/229, 370/238, 248, 389, 400, 431, 437, 351; 718/105; 716/13

See application file for complete search history.

(56) References Cited

U.S. PATENT DOCUMENTS

| | | | | |
|---|---|---|---|---|
| 4,991,204 A | * | 2/1991 | Yamamoto et al. | 379/221.01 |
| 6,111,881 A | * | 8/2000 | Soncodi | 370/395.32 |
| 6,195,336 B1 | * | 2/2001 | Stumer | 370/238 |
| 6,570,867 B1 | * | 5/2003 | Robinson et al. | 370/351 |
| 6,654,361 B1 | * | 11/2003 | Dommety et al. | 370/331 |
| 6,697,333 B1 | * | 2/2004 | Bawa et al. | 370/238 |
| 6,711,420 B1 | * | 3/2004 | Amerga et al. | 455/562.1 |
| 6,895,441 B1 | * | 5/2005 | Shabtay et al. | 709/238 |
| 6,956,821 B1 | * | 10/2005 | Szviatovszki et al. | 370/237 |
| 2002/0015386 A1 | * | 2/2002 | Kajiwara | 370/248 |

OTHER PUBLICATIONS

Singh, S. 1986. Improved methods for storing and updating information in the out-of-kilter algorithm. J. ACM 33, 3 (May. 1986), 551-567. DOI= http://doi.acm.org/10.1145/5925.5934.*

Zhu, J.Z.; Xu, G.Y. Approach to automatic contingency selection by reactive type performance index. Generation, Transmission and Distribution [see also IEE Proceedings-Generation, Transmission and Distribution], IEE Proceedings C, vol. 138, Iss. 1, Jan. 1991.*

(Continued)

*Primary Examiner*—Chau Nguyen
*Assistant Examiner*—Kerri M. Dyke
(74) *Attorney, Agent, or Firm*—Phillip J. Feig

(57) ABSTRACT

A method is disclosed that provides an ordered sequence of reassignments of communications paths to new routes. The network may have multiple excessively long communications paths, referred to as out-of-kilter paths, while other communications paths are of acceptable length, referred to as in-kilter paths. The method approximately optimizes a predefined objective such as maximizing the number of reassigned out-of kilter communications paths. The method may reassign multiple in-kilter paths to new routes in order to free up capacity and allow the reassignment of an out-of-kilter path. Reassignments are executed one at a time according to the ordered sequence determined by the method, and no capacity violations are incurred on any network link at any point in time during the execution of the sequence of reassignments. All reassigned communications paths will be in-kilter.

9 Claims, 2 Drawing Sheets

OTHER PUBLICATIONS

R. K. Ahuja, T. L. Magnanti, and J. B. Orlin, Network Flows: Theory, Algorithms, and Applications, Prentice Hall, Englewood Cliffs, New Jersey, 1993 (Section 3.4 and Chapter 17).

G. R. Ash, R. H. Cardwell, and R. P. Murray, Design and Optimization of Networks With Dynamic Routing, The Bell System Technical Journal, 60, 1787-1820, 1981.

A. Balakrishnan and K. Altinkemer, Using a Hop-Constrained Model to Generate Alternative Communication Network Design, ORSA Journal on Computing, 4, 192-205, 1992.

D. Bienstock and I. Saniee, ATM Network Design: Traffic Models and Optimization-Based Heuristics, Telecommunications Systems, 16, 399-421, 2001.

T. Carpenter, K. R. Krishnan, and D. Shallcross, Enhancements to Traffic Engineering for Multi Protocol Label Switching, In (editors: J. M. De Souza, N. L. S. Da Fonseca and E. A. De Souza E Silva) Teletraffic Engineering in the Internet Era, Proceeding of the International Teletraffic Congress—ITC 17, Salvador de Bahia, Brazil, Sep., 2001, Elsevier, Amsterdam, 2001 (vol. 4, 529-540).

S. Christensen, Voice Over IP Solutions, White Paper, 2000-11-001, Juniper Networks, Jun. 2001.

K. Kompella and D. Awduche, Notes on Path Computation in Constraint-Based Routing, Internet Engineering Task Force (IETF), Network Working Group Internet Draft, draft-kompella-te-pathcomp-00.txt, 2000.

R. M. Krishnaswamy and K. N. Sivarajan, Design of Logical Topologies: A Linear Formulation for Wavelength-Routed Optical Networks With no Wavelength Changers, IEEE/ACM Transactions on Networking, 9, 186-198, 2001.

T. Li, MPLS and the Evolving Internet Architecture, IEEE Communications Magazine, 37 No. 12, 38-41, Dec. 1999.

G. C. Sackett and C. Y. Metz, ATM and Multi-protocol Networking, McGraw-Hill, New York, 1997 (Chapter 6).

J. Y. Yen, Finding the K Shortest Loopless Paths In a Network, Management Science, 17, 712-716, 1971.

* cited by examiner

APPARATUS AND METHOD FOR GRACEFUL REASSIGNMENT OF OUT-OF-KILTER COMMUNICATIONS PATHS

FIELD OF THE INVENTION

The present invention relates to communications networks. More specifically, the present invention relates to decreasing the length of routes in packet switched networks.

BACKGROUND OF THE INVENTION

In a packet switched communications network, when a first user sends a message to a second user, many things occur. First, the message is divided into smaller units of the message. Next, each smaller unit of message, also referred to as a payload, is combined with a "header." The header may contain various types of information such as a message source, a message destination, and other information (or any combination thereof). The combination of a header and a payload forms a "packet" of information.

Each node of a packet switched network attempts to ensure that any packet it receives is, eventually, sent to the intended node (i.e., a node associated with the second user). The packet may have to travel through numerous nodes in order to reach its final destination. Each time a packet travels from one node to another, it is said to have "hopped" from node to node. Once all the packets of a particular message are received at the destination node, the packets are "decoded" and assembled into the original message. The second user may then view the message.

A primary goal of packet switched communications networks is to minimize the time delay between the sending and the receiving of a message. One factor contributing to the time delay is the number of hops a packet must make prior to arriving at its destination node. Thus, many people have attempted to reduce the number of hops a packet must make when going from a source node to a destination node. The sequence of nodes, or, equivalently, the sequence of links, through which all packet must travel when going from a source node to a destination node are specified and, collectively, referred to as the "communications path" ("CP"). One or more CPs are specified for each combination of source-destination nodes. Examples of network technologies that use CPs as their mean for transferring packets include Internet Protocol (IP) networks with Multi-Protocol Label Switching (MPLS) technology and Asynchronous Transfer Mode (ATM) networks. Chapter 6 of G. C. Sackett and C. Y. Metz, *ATM and Multi-protocol Networking*, McGraw-Hill, New York, 1997 and T. Li, MPLS and the Evolving Internet Architecture, *IEEE Communications Magazine*, 37 No 12, 38–41, December 1999 are a sample of general references on ATM and IP-MPLS networks.

CPs are changed over time primarily due to congestion or failures detected on certain network elements. The changes in the CPs are executed either automatically by the switches or routers, or by external traffic control software. Over time, the changes in these CPs may lead to excessively long CPs, which adversely affect the network performance in multiple ways. These excessively long CPs are referred to as out-of-kilter paths ("OKPs"). CPs that are not excessively long are referred to as in-kilter paths ("IKP"). When CPs are out-of-kilter, network resources are used inefficiently, which, in turn, require additional capital investments in order to expand capacity on various links and nodes. More importantly, the end-to-end performance, in terms of expected packet delay, jitter and loss, may deteriorate and become unacceptable to customers. Network service providers may violate their Service Level Agreements ("SLAs") with customers, which may result in significant monetary refunds and/or loss of customers.

The importance of limiting the number of hops of CPs has arisen in a variety of routing contexts. Representative references include G. R. Ash, R. H. Cardwell, and R. P. Murray, Design and Optimization of Networks With Dynamic Routing, *The Bell System Technical Journal*, 60, 1787–1820, 1981 for circuit-switched networks, K. Kompella and D. Awduche, Notes on Path Computation in Constraint-Based Routing, *Internet Engineering Task Force (IETF), Network Working Group Internet Draft*, draft-kompella-te-pathcomp-00.txt, 2000 and S. Christensen, Voice Over IP Solutions, *White Paper*, 2000-11-001, *Juniper Networks*, June 2001 for packet switched networks, and R. M. Krishnaswamy and K. N. Sivarajan, Design of Logical Topologies: A Linear Formulation for Wavelength-Routed Optical Networks With no Wavelength Changers, *IEEE/ACM Transactions on Networking*, 9, 186–198, 2001 for optical networks. CPs with a bounded number of hops also arise in network design models. This is explained in, for example, A. Balakrishnan and K. Altinkemer, Using a Hop-Constrained Model to Generate Alternative Communication Network Design, *ORSA Journal on Computing*, 4, 192–205, 1992 and D. Bienstock and I. Saniee, ATM Network Design: Traffic Models and Optimization-Based Heuristics, *Telecommunication Systems*, 16, 399–421, 2001.

A CP is characterized as either an OKP or as an IKP. The definition of an OKP is a CP that has too many hops. The number of hops of a CP may be too many if, for example, it exceeds a predetermined number. As another example, the number of hops of a specified CP may be too many if it exceeds a predetermined multiplier of the number of hops in the shortest path (in terms of hops) between the source and destination nodes of that CP. Other ways of determining if a CP has too many hops will be apparent to those skilled in the art. CPs that are not OKPs are IKPs. The method for reassigning OKPs is independent of the definition used to divide between OKPs and IKPs. Any OKP that is reassigned will be in-kilter after the reassignment, and any IKP that is reassigned will remain in-kilter after the reassignment. Reassignment of IKPs is permitted in order to generate spare capacity on certain network links so that more OKPs can be reassigned.

Typically, multiple CPs need to be reassigned. These reassignments are executed in a sequence, one at a time. Hence, it is important not only to determine the set of CPs that should be reassigned, but also the ordered sequence in which these CPs should be reassigned. Even if capacity constraints are satisfied upon completion of all reassignments on all network links, temporary capacity violation may incur after the execution of any subset of these reassignments, unless the method explicitly prevents such violations. Also, a CP should be reassigned in one piece into a single new route rather than be split onto multiple routes. The recommended sequence of reassignments approximately optimizes a predefined objective such as, but not limited to, maximizing the number of reassigned OKPs or maximizing the total load reassigned from OKPs to IKPs.

There are numerous methods that determine CPs. For example, R. K. Ahuja, T. L. Magnanti, and J. B. Orlin, *Network Flows: Theory, Algorithms, and Applications*, Prentice Hall, Englewood Cliffs, N.J., 1993 (hereinafter "Ahuja") disclose, in chapter 17, models that deal with routing point-to-point demands in a network subject to link capacity constraints. These are well studied models and known in the literature as multi-commodity network flow models. CP reassignments can be formulated using the path formulation for such models by appropriately setting of cost parameters to the paths. However, these models have shortcomings. They do not provide an ordered sequence of reassignments and, thus, the solution may incur temporary capacity violations; and the existing CPs may be split to multiple new routes.

T. Carpenter, K. R. Krishnan, and D. Shallcross, Enhancements to Traffic Engineering for Multi Protocol Label Switching, in (editors: J. M. De Souza, N. L. S. Da Fonseca and E. A. De Souza E Silva) *Teletraffic Engineering in the Internet Era, Proceeding of the International Teletraffic Congress-ITC* 17, Salvador de Bahia, Brazil, September, 2001, Elsevier, Amsterdam, 2001 (Volume 4, 529–540) (hereinafter "Carpenter") describe variations of multi-commodity network flow models to determine CPs, called Label-Switched Paths, for IP networks with MPLS. However, as Carpenter is based on standard multi-commodity network flow models, it has the same shortcomings specified above, namely, temporary capacity violations may occur and CPs may be split onto multiple routes. Carpenter mentions the importance of not splitting CPs and proposes to solve first a network flow model which allows splitting and then, using the results, to solve a restricted version of the flow model with integer variables. However, as Carpenter observes, the restricted problem may still be very difficult to solve and may lead to solutions that are not close to optimal.

SUMMARY OF THE INVENTION

The invention is directed toward a device wherein OKPs are reassigned in a manner that is more efficient than the art. Efficiency is improved because the reassignment of OKPs permits reassignments of IKPs in order to most efficiently accommodate the reassignment of the OKPs. More specifically, a device made in accordance with the invention would comprise means for analyzing a representation of a set of out-of-kilter communications paths and a representation of a set of in-kilter communications paths. Such a device would also comprise means, responsive to the means for analyzing, for permitting changes to both the representation of the set of out-of-kilter communications paths and the representation of the set of in-kilter communications paths. Finally, such a device would also comprise means, responsive to the means for permitting changes, for generating an ordered sequence of recommended reassignments of communications paths and for associating at least one out-of-kilter communications path associated with the ordered sequence of recommended reassignments with a new in-kilter communications path.

A corresponding method is disclosed that provides an ordered sequence of reassignments, called a graceful reassignment solution. In such a solution: (i) the total number of reassigned paths cannot exceed a predetermined number, (ii) no temporary capacity violations are incurred on any network link during the execution of the sequence of reassignments (reassignments are executed one at a time), (iii) a reassigned CP is reassigned as a unit without being split among multiple alternate routes, (iv) all reassigned CPs will be in-kilter, (v) CPs which are originally in-kilter are reassigned only if such reassignments make it feasible to reassign an OKP, and (vi) the recommended sequence of reassignments approximately optimizes a predefined objective such as, but not limited to, maximizing the number of reassigned OKPs or maximizing the total load reassigned from OKPs to IKPs.

The definition for the dividing line between what is considered an OKP and an IKP is flexible, and the method for reassigning CPs is independent of the definition used to divide between OKPs and IKPs. The method identifies subsequences for reassignments, starting with subsequences that consist of one reassignment, followed by subsequences with two reassignments, and so forth, up to subsequences with a predetermined number of reassignments. Upon completion, the subsequences are combined to a recommended ordered sequence of reassignments. Searching directly for subsequences of reassignments is impractical due to the enormous number of combinations that may exist in networks. Instead, the method searches for a certain type of subsequences, called backward subsequences. The method takes advantage of various properties and uses a layered search tree for constructing backward subsequences while cutting significantly the number of combinations that needs to be searched. Furthermore, taking advantage of more properties, the method reverses the order of reassignments in each backward subsequence (the first one becomes the last, the second one becomes to the one before last, and so forth). The reversed subsequences are combined to form a recommended ordered sequence of reassignments of the graceful reassignment solution.

DETAILED DESCRIPTION

Figure 1:
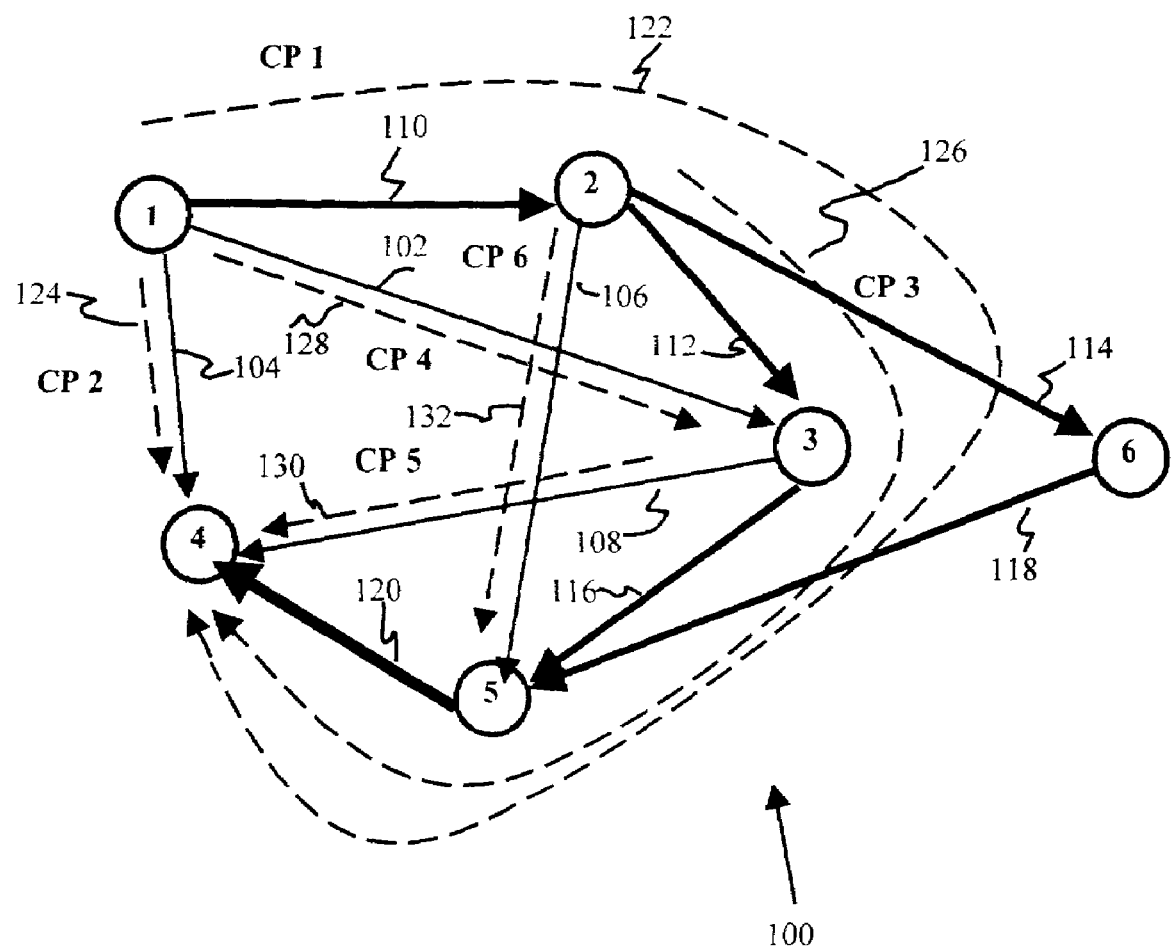
FIG. 1 shows an example of a small communications network with six nodes, 10 links and six CPs.

The detailed description of the present invention is separated into two parts. The first part, entitled "General Detailed Description," provides a general description of the present invention with reference to the figures. The second part, entitled "A Preferred Method," provides a more formal and detailed view of the "General Detailed Description."

General Detailed Description:

Effective reassignment of OKPs onto new routes may require the reassignments of other paths, which are IKPs, in order to generate spare capacity on some links. Reassignments are executed sequentially, one at a time. A graceful reassignment solution provides an ordered sequence of reassignments in which: (i) the total number of reassigned CPs cannot exceed a specified number, (ii) no temporary capacity violations are incurred on any network link during the execution of the sequence of reassignments (the CPs are reassigned one at a time), (iii) a reassigned CP is reassigned as a unit without being split among multiple alternate routes, (iv) all reassigned CPs will be in-kilter, (v) CPs which are originally in-kilter are reassigned only if such reassignments make it feasible to reassign an OKP, and (vi) the recommended sequence of reassignments approximately optimizes a predefined objective such as, but not limited to, maximizing the number of reassigned OKPs or maximizing the total load reassigned from OKPs to IKPs.

The resulting problem is formulated as a new multi-period, multi-commodity network flow problem with integer variables. The formulation ensures that only graceful reassignment solutions will be considered. A period is defined as a time slot during which a single reassignment of a CP is executed. The periods are interrelated since a reassignment in one period affects the spare capacities in the network links in subsequent periods. The multi-period aspect of the formulation allows the imposition of constraints that prevent temporary capacity violations after any of the reassignments.

The ordered sequence of reassignments can be decomposed into subsequences, where each such subsequence has as its last element a CP that is out-of-kilter before its reassignment. We define an "n-forward subsequence" as an ordered subsequence of n CP reassignments that are part of the graceful reassignment solution. Searching directly for forward subsequences that will constitute the solution will require a formidable search effort. Instead, our method searches for "n-backward subsequences", using the concept of perceived loads. The precise definitions of perceived loads and backward subsequences will be given formally later. Here, it suffices to say that Propositions 1 and 2, described below, assert that the reverse subsequence of a backward subsequence is a forward subsequence that can be part of the graceful reassignment solution, as it will satisfy all the conditions required by that solution. Propositions 3 and 4, described below, cut significantly the number of possible combinations that need to be evaluated in a search for backward subsequences. Therefore, searching for backward subsequences is significantly more efficient than searching directly for forward subsequences. The method constructs multiple layered search trees that identify backward subsequences (e.g., FIG. 2). The first element in a backward subsequence is an OKP before its reassignment. In addition to taking advantage of various characterization properties, the layered search trees uses heuristic rules in order to further cut the number of evaluated subsequences, while still providing an attractive graceful reassignment solution.

The layered search tree for backward subsequences, which takes advantage of proven properties and heuristic rules, is the preferred solution method as it provides an effective graceful reassignment scheme. This is because the integrality constraints of CP reassignments (splitting is not allowed) and the multi-period setting make the formulation extremely large even for moderate size networks, well beyond the capabilities of integer programming solvers. Constructing a layered search tree for forward subsequences or enumeration of all possible path reassignment sequences is also impractical.

A Preferred Method:

Referring to FIG. 1, a simple network example is provided. The nodes, labeled 1, 2 . . . and 6 represent switches or routers in communications network 100. The nodes are connected by directed links. For convenience, the links are referred to by their end points, e.g., link (1, 2) starts at node 1 and ends at node 2. Links (1, 3), (1, 4), (2, 5) and (3, 4) have capacity 1 and are labeled 102, 104, 106, and 108, respectively; links (1, 2), (2, 3), (2, 6), (3, 5) and (6, 5) have capacity 2 and are labeled 110, 112, 114, 116, and 118, respectively; and link (5, 4) has capacity 3 and is labeled 120. Network links have, in practice, capacity in either direction. In FIG. 1, this would be represented by two links, one in each direction. To simplify the example, only one of the directions on each link is considered. The network has 6 CPs (CP 1, . . . CP 6), each requiring one unit of load (bandwidth) and labeled 122, 124, 126, 128, 130, and 132, respectively. For instance, CP 1 122 from node 1 to node 4 uses a route of 4 links: (1, 2), (2, 3), (3, 5) and (5, 4) 110, 112, 116 and 120, and CP 3 126 from node 2 to node 4 uses a route of 3 links: (2, 3), (3, 5) and (5, 4) 112, 116 and 120. A CP is considered out-of-kilter if it has more than two hops. Hence, CP 1 122 and CP 3 126 are out-of-kilter. Any alternate route for a reassigned CP should therefore not exceed two hops. Suppose the reassignment of up to five CPs is permitted, while no subsequence of reassignments can exceed three reassignments. The following ordered sequence of five reassignments will have all CPs traversing routes with 1 or 2 hops, while not creating any temporary capacity violations. First, reassign CP 6 132 onto route (2, 6), (6, 5) 114, 118. Second, reassign CP 3 126 onto route (2, 5), (5, 4) 106, 120. These two reassignments comprise a 2-forward subsequence. Third, reassign CP 4 128 onto route (1, 2), (2, 3) 110, 112. Fourth, reassign CP 5 130 onto route (3, 5), (5, 4) 116, 120. Fifth, reassign CP 1 122 onto route (1, 3), (3, 4) 102, 108. The latter three reassignments comprise a 3-forward subsequence. This reassignment sequence, consisting of the two subsequences, satisfies all of the graceful reassignment conditions. Furthermore, all six CPs are in-kilter after the five reassignments are completed.

Our layered tree first searches for backward subsequences of length one, i.e., for 1-backward subsequences. None exists in this example. The tree then searches for 2-backward subsequences. It finds such a subsequence, namely, reassigning first CP 3 126 and then CP 6 132. This 2-backward subsequence is translated to a 2-forward subsequence (the reverse of the backward subsequence), namely, reassign first CP 6 132 and then CP 3 126. No more 2-backward subsequences can be found. The tree then searches for 3-backward subsequences. It finds one, namely, CP 1 122, CP 5 130 and CP 4 128. This is translated to a 3-forward subsequence, namely, CP 4 128, CP 5 130 and CP 1 122. The search for backward subsequences will further be explained below in FIG. 2.

Figure 2:
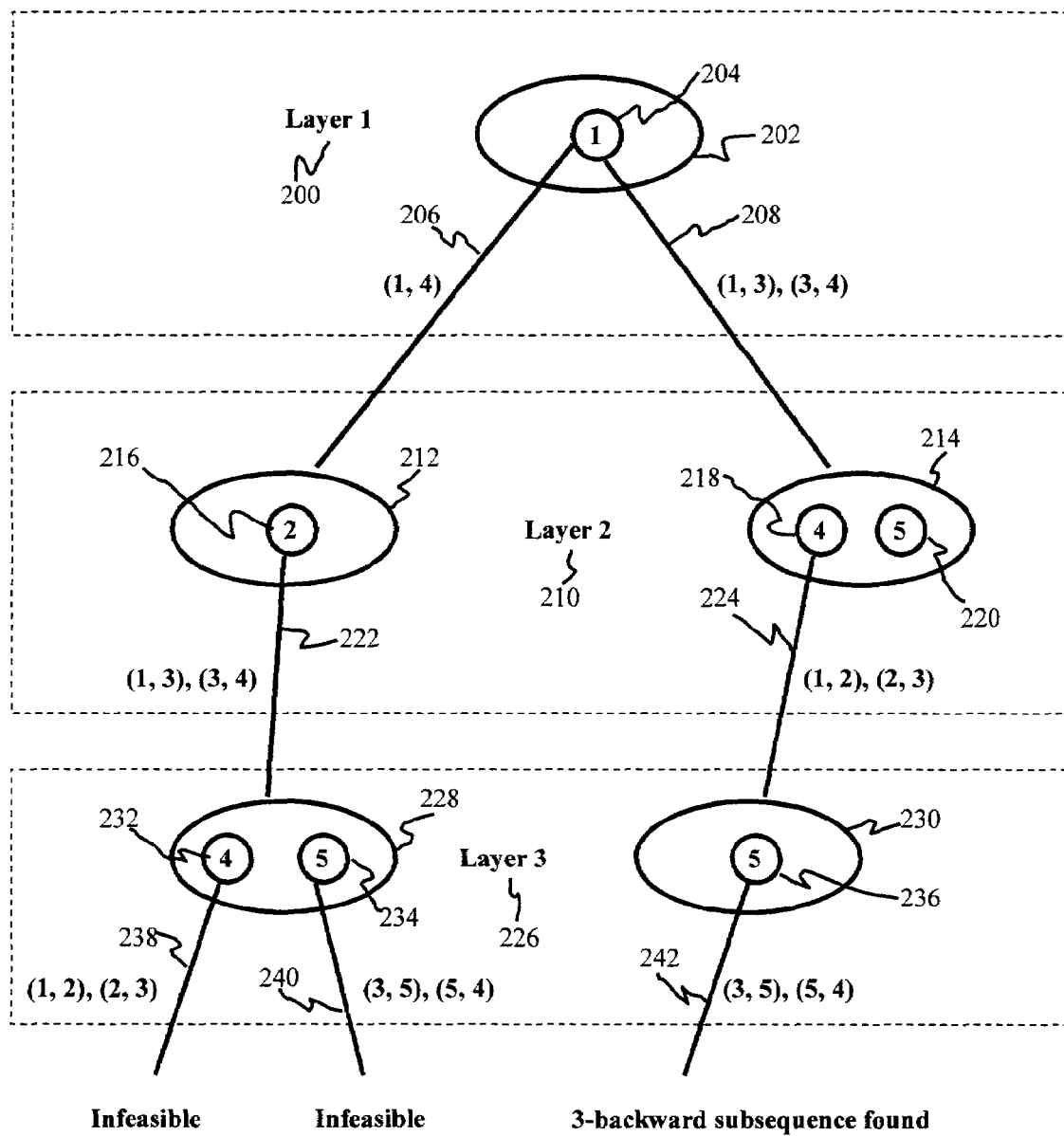
FIG. 2 shows the layered search tree with 3 layers for the example given in FIG. 1.

FIG. 2 shows the layered search tree for 3-backward subsequences for the network described in FIG. 1. Propositions 1 and 2, discussed below, assert that instead of attempting to find directly forward subsequences, one may focus on finding backward subsequences. Each n-backward subsequence can readily be translated to an n-forward subsequence that satisfies the constraints of a graceful reassignment solution by simply selecting the reverse subsequence. At this point, the search for subsequences of length 1 and 2 is completed. We assume that the search found the 2-backward subsequence discussed above (CP 3 126 and then CP 6 132), which is translated to the 2-forward subsequence (reassigning CP 6 132 onto route (2, 6), (6, 5) 114, 118, followed by reassigning CP 3 126 onto route (2, 5), (5, 4) 106, 120). The latter two reassignments are the first and second reassignments in the ordered sequence of reassignments that provides a graceful reassignment solution.

Referring to FIG. 2, layer 1 200 includes a single super-node 202. The super-node at layer 1 includes nodes that represent CPs that are still out-of-kilter. In our example of FIG. 1, the super-node includes only node 1 204, representing CP 1 (CP 3 was already reassigned onto a route of 2 hops). The method then selects node 1 204 and generates multiple alternate routes that have at most two hops. The edges from node 1 204 represent the alternate routes. There are two alternate routes. One route 206 consists of link (1, 4) (i.e., the link from node 1 to node 4 in the example in FIG. 1). The second route 208 consists of links (1, 3) and (3, 4). A combination of a node and an edge in FIG. 2 represents a reassignment. For example, the combination of node 1 204 and edge 206 represents reassigning CP 1 onto the route consisting of link (1, 4).

The search method follows a standard depth-first search for trees (see, for example Section 3.4 of Ahuja). Thus, edge 206 is selected. The edge generates a new super-node 212 in layer 2 210. The edges included in super-node 212 are determined using Proposition 3 described below. The proposition helps to significantly cut the number of nodes that need to be included. In this example, the search method includes only node 2 216, representing CP 2, in super-node 212. Selecting node 2 216, only one alternate route is generated, i.e., edge 222. This edge represents a route consisting of links (1, 3) and (3, 4). The heuristic thus formed a subsequence of two reassignments (CP 1 onto route (1, 4) followed by CP 2 onto route (1, 3), (3, 4)), however, this is not a valid 2-backward subsequence, so that the search continues.

Edge 222 generates super-node 228 at layer 3 226. Since layer 3 is the last layer, we use Proposition 4, described below, to determine which nodes should be included in a super-node. Proposition 4 helps to cut the number of nodes in a super-node even more than Proposition 3, however, it holds only for the last layer. The method includes node 4 232 and node 5 234 in super-node 228, Nodes 4 and 5 represent CPs 4 and 5, respectively. The method selects node 4 and generates edges representing alternate routes. In this case, only a single edge 238 is generated, representing a route with links (1, 2) and (2, 3). The search now has a subsequence of three reassignments, however it is not a 3-backward subsequence. (The conditions for checking the latter use the definition of backward subsequences given below. It is easy to verify though that the reverse of this subsequence does not constitute a valid 3-forward subsequence since it violates some capacity constraints).

The search now backtracks to the second node in the same super-node, namely node 5 234, representing CP 5. The method generates edge 240, representing alternate route with links (3, 5) and (5, 4). Again, the resulting subsequence is not a 3-backward subsequence.

The search now backtracks to node 1 204 in super-node 202 in layer 1 200. It selects the remaining edge from that node. This is edge 208, representing a route with links (1, 3) and (3, 4). The edge generates super-node 214 at layer 2 210. By Proposition 3, nodes 4 218 and 5 220, representing CPs 4 and 5, respectively, are included in super-node 214. The method selects node 4 218 and generates a single edge 224, representing route with links (1, 2) and (2, 3). Edge 224 generates super-node 230 at layer 3 226. By Proposition 4, the method includes node 5 236 in super-node 230. Super-node 5 then generates edge 242, representing a route with links (3, 5) and (5, 4). The method thus constructed the following subsequence: node 1 204, edge 208, node 4 218, edge 224, node 5 236, edge 242. This subsequence implies the following: First reassign CP 1 onto a route with links (1, 3) and (3, 4), then reassign CP 4 onto route with links (1, 2) and (2, 3), and finally reassign CP 5 onto route with links (3, 5) and (5, 4). This is a 3-backward subsequence. Thus, its reverse subsequence (first reassigning CP 5 onto route with links (3, 5) and (5, 4), then reassigning CP 4 onto route with links (1, 2) and (2, 3), and finally reassigning CP 1 onto a route with links (1, 3) and (3, 4)) is a 3-forward subsequence that becomes part of the graceful reassignment solution. Specifically, reassignment of CPs 5, 4 and 1 are the third, fourth and fifth reassignments, respectively, in the ordered sequence that provides the graceful reassignment solution. All six CPs will be in-kilter after the execution of the five reassignments.

Formulation, Heuristic Rules, Propositions and Additional Methodology

A network G(N, A) is specified by a set of nodes N and a set of directed links A. Each link $a \in A$, has capacity c(a). Traffic is routed from source nodes to destination nodes through CPs. The CPs are denoted by an index $p \in P$, where P is the set of CPs. CP p is associated with a source node, a destination node, a set of directed links that establish a route from the source node to the destination node, and the load L(p) of CP p. There may exist multiple CPs (each of these identified by a different value of p) with different routes connecting a source-destination pair.

The starting conditions are as follows: CP p is assigned to route $r_0(p)$ for all $p \in P$, the number of hops of route $r_0(p)$ is $h_0(p)$, and the total load on any link $a \in A$ does not exceed the link capacity c(a). CP p is considered out-of-kilter if and only if $h_0(p)$ exceeds a specified threshold h(p), where, for instance, h(p) may be proportional to the number of hops in the min-hop path from the source node to the destination node of CP p. Let $P_s \subseteq P$ be the set of OKPs.

Let $r_i(p)$, i=1, 2, ..., R(p), be the alternate routes onto which CP p can be reassigned, where R(p) is an upper bound on the number of alternate routes. Let $h_i(p)$ be the number of hops of route $r_i(p)$. All alternate routes for CP p should satisfy $h_i(p) \leq \gamma(p)h(p)$, where $\gamma(p)$ is a constant that does not exceed one. Hence, any reassigned CP will be in-kilter.

A goal is to reassign the OKPs, while limiting the total number of reassignments to at most M. Let $d_i(p)$, for i=1, 2, ..., R(p) and $p \in P_s$, be the reward for reassigning OKP p to alternate route i. One choice is to set all these $d_i(p)$'s to 1, which implies that we consider each reassignment of an OKP equally rewarding. Other choices include setting $d_i(p)$ =L(p) for all i=1, 2, ..., R(p) and $p \in P_s$, which implies that we consider reassignment of OKPs with larger loads more rewarding. The present model allows reassignments of IKPs if it helps reassignments of some OKP. In order to avoid unnecessary reassignments of IKPs, a cost of $\epsilon > 0$ (an arbitrarily small positive constant) is incurred for each such reassignment. Let $e[a, r_i(p)]$ be an indicator function, such that $e[a, r_i(p)]=1$ if link a is in route $r_i(p)$ and 0 otherwise. Recall our starting condition that the network does not have any capacity violations before the reassignments, implying $$\sum_{p \in P} e[a, r_0(p)]L(p) \leq c(a), \quad a \in A.$$

The reassignments of CPs are executed sequentially, one at a time. An ordered sequence of M time slots t, t=1, 2, ..., M is defined. Let $y_{it}(p)=1$ if CP p is reassigned to its alternate route i at time slot t and 0 otherwise, where i=1, 2, ..., R(p), t=1, 2, ..., M, and $p \in P$. Let $y_0(p)=0$ if CP p is reassigned at some time slot, otherwise $y_0(p)=1$.

Formulation of the graceful reassignment model is as follows:

$$\text{Maximize} \left[ \sum_{p \in P_s} \sum_{i=1}^{R(p)} \sum_{t=1}^{M} (d_i(p) - \delta t) y_{it}(p) - \sum_{p \in P \backslash P_s} \sum_{i=1}^{R(p)} \sum_{t=1}^{M} \epsilon y_{it}(p) \right] \quad (1.1)$$

$$\sum_{p \in P} \sum_{i=1}^{R(p)} y_{it}(p) \leq 1, t = 1, 2, \ldots, M \quad (1.2)$$

$$\sum_{i=1}^{R(p)} \sum_{t=1}^{M} y_{it}(p) + y_0(p) = 1, \ p \in P \quad (1.3)$$

$$\sum_{p \in P} \left\{ \sum_{i=1}^{R(p)} \sum_{\tau=1}^{t} e[a, r_i(p)] L_p y_{i\tau}(p) + \sum_{i=1}^{R(p)} \sum_{\tau=t+1}^{M} e[a, r_0(p)] L_p y_{i\tau}(p) + e[a, r_0(p)] L_p y_0(p) \right\} \leq c(a), \quad (1.4)$$

$y_0(p)=0, 1, y_{it}(p)=0, 1, i=1, 2, \ldots, R(p), t=1, 2, \ldots, M, p \in P,$ (1.5)

where $\delta$ is an arbitrarily small constant. Objective function (1.1) rewards the reassignment of OKPs, while penalizing reassignment of IKPs. The penalty of $-\delta t$ ensures that all reassignments are executed in sequential time slots, i.e., if there are reassignments in time slots t and t+2, then there will also be a reassignment in time slot t+1. Constraints (1.2) limit the number of reassignments to one per time slot, which also implies at most M reassignments. Constraints (1.3) state that each CP can be reassigned at most once.

There may be situations where reassigning the same CP more than once may lead to a better solution (this will be discussed below). Constraints (1.4) ensure that there are no capacity violations on any link at each time slot. Constraints (1.5) enforce that a CP will not be split among multiple routes. A solution to (1.1)–(1.5) provides a graceful reassignment solution.

Reassignment (p, i) is defined as changing the route of CP p from its original route $r_0(p)$ to its i-th alternate route, $r_i(p)$. The sequence of reassignments can be partitioned into multiple ordered subsequences, where each such subsequence consists of n, n=1, 2, 3, . . . reassignments, where the last reassignment (p, i) in a subsequence is associated with some $p \in P_s$.

Heuristic Rule 1. The search will be limited to subsequences whose length does not exceed a predetermined number $n_{max}$. This implies that up to $n_{max}-1$ reroutes of IKPs are permitted in order to facilitate the rerouting of one OKP.

Heuristic Rule 2. The maximal number of alternate routes for CP p will be limited to R(p) for all $p \in P$ (although not required, usually R(p) will be the same for all p). In our heuristic, the alternate routes will be adaptively changed, depending on the loads carried on the links. The precise determination of these routes will be explained later.

Let $f_0(a)$ be the load on link a before the first reassignment of a subsequence, $f_0(a) \leq c(a)$ for all $a \in A$. Consider a subsequence of n reassignments $(p_1, i_1), (p_2, i_2), \ldots, (p_n, i_n)$ (i.e., the first reassignment is $(p_1, i_1)$ and the last one is $(p_n, i_n)$). For every link $a \in A$, the perceived loads $f_l(a)$ after the l-th reassignment are derived as follows:

For l=1, 2, . . . , n,
  Set $p \leftarrow p_l$ and $i \leftarrow i_l$.
  For all $a \in A$:
    If $e[a, r_0(p)]=0$ and $e[a, r_i(p)]=1$, then $f_l(a) \leftarrow f_{l-1}(a)+L(p)$;
    If $e[a, r_0(p)]=1$ and $e[a, r_i(p)]=0$, then $f_l(a) \leftarrow \max[f_{l-1}(a)-L(p), f_0(a)]$;
    Else, $f_l(a) \leftarrow f_{l-1}(a)$.
  End (For all $a \in A$).
End(For l=1, 2, . . . ,n).

Thus, the perceived load on any link a never decreases below $f_0(a)$.

An n-backward subsequence is a subsequence of n reassignments $(p_1, i_1), (p_2, i_2), \ldots, (p_n, i_n)$ (i.e., the first reassignment is $(p_1, i_1)$ and the last one is $(p_n, i_n)$), such that: CP $p_1 \in P_s$ and $f_n(a) \leq c(a)$ for all $a \in A$. Capacity violations of perceived loads may exist during intermediate steps when fewer than n reassignments have been completed.

Proposition 1. Suppose $f_0(a) \leq c(a)$ for all $a \in A$. Consider an n-backward subsequence of reassignments $(p_1, i_1), (p_2, i_2), \ldots, (p_n, i_n)$. Then, the reverse subsequence of these reassignments $(p_n, i_n), (p_{n-1}, i_{n-1}), \ldots, (p_1, i_1)$ has no temporary capacity violations (i.e., constraints (1.4) are satisfied). The reverse subsequence is called an n-forward subsequence.

Proposition 2. Suppose $f_0(a) \leq c(a)$ for all $a \in A$. Consider an n-forward subsequence of reassignments $(p_n, i_n), (p_{n-1}, i_{n-1}), \ldots, (p_1, i_1)$. Then, the reverse of this subsequence $(p_l, i_l), (p2, i_2), \ldots, (p_n, i_n)$ is an n-backward subsequence.

Propositions 1 and 2 show that there is a one-to-one correspondence between an n-backward subsequence and an n-forward subsequence. Thus, a search for a graceful reassignment solution can restrict attention to searching for n-backward subsequences. This property is important since the search for n-backward subsequences takes advantage of properties described in propositions 3 and 4 below. Such properties do not exist for forward subsequences.

Proposition 3. Suppose $(p_1, i_1), \ldots, (p_l, i_l), \ldots, (p_n, i_n)$ is an n-backward subsequence. Let $A_l$ be the subset of links $a \in A$ for which $f_l(a) > f_0(a)$ for a specific l. Suppose $e[a, r_0(p_{l+1})]=0$ for all $a \in A_l$. Then, the backward subsequence above, without reassignment $(p_{l+1}, i_{l+1})$, is an (n-1)-backward subsequence.

Proposition 3 may significantly decrease the number of nodes that are included in the various super-nodes in a search tree for backward subsequences. Suppose $(p_1, i_1), (p_2, i_2), \ldots, (p_l, i_l)$ are the l reassignments preceding a super-node in layer l+1. These l reassignments define a subset of links $A_l$. Then, CP $p_{l+1}$ is included in the super-node at layer l+1 only if at least one of the links of its current route $r_0(p_{l+1})$ is in the set $A_l$.

At layer n, using Proposition 4 given below, the number of nodes in a super-node can be decreased even more.

Proposition 4. Suppose $(p_1, i_1), \ldots, (p_{n-1}, i_{n-1}), (p_n, i_n)$ is an n-backward subsequence $B_{n-1}$ be the subset of links $a \in A$ for which $f_{n-1}(a) > c(a)$. Then, $p_n$ is such that all links in $B_{n-1}$ are included in route $r_0(p_n)$ and $L(p_n) \geq f_{n-1}(a) - c(a)$ for all $a \in B_{n-1}$.

The model formulation (1.1)–(1.5) limits each CP to, at most, one reassignment. Thus, any CP that was already reassigned in a previously generated subsequence, or is part of the subsequence under construction, is excluded from further consideration. The layered search heuristic for backward subsequences can readily handle this constraint. It can also readily handle multiple reassignments of the same CP as long as these reassignments are in different subsequences. The heuristic cannot handle multiple reassignments of the same CP in a single subsequence since such an n-backward subsequence cannot be transformed to an n-forward subsequence.

The present heuristic method first constructs a search tree with a single layer. This is a special case, as it implies looking for reassignment of OKPs without resorting to any reassignment of other CPs. Hence, for each CP (represented by a node in the super-node), we construct a single alternate route that is the min-hop path restricted to using links that have sufficient capacity to accommodate the rerouted CP. After completing all reassignments found by the search tree with a single layer, a search tree with two layers (layers 1 and 2) is constructed in order to find 2-backward subsequences. Next, a search tree with three layers is constructed, etc., up to a tree with $n_{max}$ layers.

In search trees with more than one layer, the edges originating from each node p correspond to the limited number, up to R(p), alternate routs. Suppose $r_0(p)$ starts at node u and terminate at node v. A constrained K-shortest path problem to generate alternate routes from u to v is solved. Let f(a) be the current perceived load on link a. To increase the likelihood of finding backward subsequences with a small number of layers in the search tree, we use $\max[f(a)-c(a), 0]+\epsilon$ ($\epsilon$ is an arbitrarily small positive constant) as the length of link a for each a that is included in route $r_0(p)$ and $\max[f(a)-c(a)+L(p), 0]+\epsilon$ as the length of link a for all other $a \in A$. Thus, the K shortest paths are those with the minimal sum of capacity violations with number of hops serving as a tiebreaker. At layers l=1, 2, . . . , (n-1), the value of K is set equal to R(p)+1 since $r_0(p)$ is likely to be among the shortest paths. At layer n, the value of K is set equal to 1 since if the shortest path, with the link metric above, would not result in an n-backward subsequence, no other path would. A complication arises since some of the shortest paths may violate the hop constraint as their number of hops may exceed $\gamma(p)h(p)$. Thus, a K-shortest path problem with the metric defined above, subject to a hop constraint, is solved.

Consider a network $G(N, A)$ and CP p, which starts at node u and terminates at node v. To solve the K-shortest path problem with the hop constraint, a network with $Z+1$ copies of the node set N in $G(N, A)$, labeled as $N_1, N_2, \ldots, N_{Z+1}$ is established, where $Z = \lfloor \gamma(p)h(p) \rfloor$ ($\lfloor x \rfloor$ is the largest integer that does not exceed x). Suppose link a' starts at node u' and terminates at node v' in $G(N, A)$. Links that connect node U' at node set $N_j$ to node v' at node set $N_{j+1}$ for $j=1, 2, \ldots, Z$ are established. Each of these links is assigned length as described above. Such links are established for all $a \in A$. An artificial destination node V is added. Also, links of length 0 are added from node v' at each set $N_2, N_2, \ldots, N_{Z+1}$ to node V. The constrained K-shortest paths are obtained by finding the unconstrained K-shortest paths problem from node $u \in N_1$ to node V. J. Y. Yen, Finding the K Shortest Loopless Paths in a Network, *Management Science*, 17, 712–716, 1971 provides an algorithm for finding these paths. Although the paths generated have no cycles in the expanded network above, the resulting shortest paths may include paths with cycles in the original network. Paths with cycles are deleted so that fewer than K alternate routes remain.

The Graceful Reassignment Heuristic

Step 0. Initialization
Derive set $P_s$ of out-of-kilter CPs.
Set COUNT=0.

Step 1. Search for 1-Backward Subsequences
Set n=1.
Establish super-node with a node for each $p \in P_s$. Prepare a sorted list of the nodes (non-increasing order of $L(p)$ if $d_i(p)=L(p)$ for all $i=1, 2, \ldots, R(p)$ and $p \in P_s$ in (1.1) and non-decreasing order of $L(p)$ if $d_i(p)=1$ for all $i=1, 2, \ldots, R(p)$ and $p \in P_s$).
While list of nodes in the super-node is not empty and COUNT<M,
  Select node from top of the list, say $p_1$. Let $r_0(p_1)$ be the current route of CP $p_1$.
  Delete node from list above.
  Find the min-hop path for CP $p_1$, where each link a along the path must satisfy
  $f_0(a)+L(p_1) \leq c(a)$. This alternate route is $r_1(p_1)$.
  If $h_1(p_1) > \gamma(p_1)h(p_1)$, go to "End (while list of nodes loop)".
  If $h_1(p_1) \leq \gamma p_1)h(p_1)$, reassign CP $p_1$ from $r_0(p_1)$ to $r_1(p_1)$:
    COUNT←COUNT+1.
    Place this reassignment into time slot COUNT.
    Update link loads:
      If $e[a, r_0(p_1)]=0$ and $e[a, r_1(p_1)]=1$, then $f_0(a) \leftarrow f_0(a)+L(p_1)$;
      If $e[a, r^0(p_1)]=1$ and $e[a, r_1(p_1)]=0$, then $f_0(a) \leftarrow f_0(a)-L(p_1)$;
      Else, $f_0(a) \leftarrow f_0(a)$.
End (while list of nodes loop).
Delete all nodes that represent CPs that were reassigned from sets P and $P_s$.
If $P_s$ is not empty, COUNT<M, and some CP was reassigned in the loop above, repeat Step 1 with the updated set $P_s$.
If $P_s$ is empty, or COUNT$\geq$M−1, or n =$n_{max}$, STOP.
Set n←n+1.

Step 2. Search for n-Backward Subsequences, n=2, 3, ..., $n_{max}$

Establish a single super-node in layer 1 with a node for each $p \in P_s$. Prepare a sorted list of the nodes in non-increasing, or non-decreasing, order of $L(p)$, as described in Step 1 above.
While list of nodes in the super-node in layer 1 is not empty and COUNT<M−n+1,
  Select a node from top of the list, say $p_1$. Let $r_0(p_1)$ be the current route of CP $p_1$.
  Delete node $p_1$ from list above.
  Perform an n layer Depth-First Search (DFS), starting from node $p_1$.
    If no l-backward subsequence is found for any $1 \leq n$, go to "end (while list of nodes loop)".
    Otherwise, an l-backward subsequence $(p_1, i_l)$, $(p_2, i_2), \ldots, (p_l, i_l)$ is found for some $1 \leq n$. Continue as described below.
  $(p_l, i_l), (p_{l-1}, i_{l-}), \ldots, (p_1, i_1)$ is an l-forward subsequence.
  Set j=l.
    While $j \geq 1$,
      Reassign $p_j$ from $r_0(p_j)$ to $r_{ij}(p_j)$.
      COUNT←COUNT+1.
      Place this reassignment into time slot COUNT.
      Update link loads for all $a \in A$:
        If $e[a, r_0(p_j)]=0$ and $e[a, r_{ij}(p_j)]1$, then $f_0(a) \leftarrow f_0(a)+L(p_j)$;
        If $e[a, r_0(p_j)]1$ and $e[a, r_j(p)]=0$, then $f_0(a) \leftarrow f_0(a)-L(p_j)$;
        Else, $f_0(a) \leftarrow f_0(a)$.
      Delete node $p_j$ from set P and, if applicable, from set $P_s$.
      Set j←j−1.
    End (while j loop).
End (while list of nodes loop).

If $P_s$ is not empty, COUNT<M−n+1, and some CP was reassigned in the loop above, repeat Step 2 with the same n and updated sets P and $P_s$.

If $P_s$ is empty, or COUNT$\geq$M−n, or n=$n_{max}$, STOP. Otherwise, set n←n+1 and go to beginning of Step 2.

The n layer Depth-First Search (DFS), applied in the heuristic method, is a standard search strategy in trees; see for example, Section 3.4 of Ahuja. A brief description of DFS adaptation to our heuristic is as follows. DFS starts with a node in layer 1, say, node $p_1$, and generates edges using the K-shortest path algorithm as described before. The edges represent alternate routes and are sorted from the shortest to the longest route (where the link metric is the same one used by the K-shortest path algorithm). After generating the edges, DFS selects the edge that represents the shortest route from among those that were not yet selected and generates a super-node and all relevant nodes in that super-node in layer 2. Then, it selects a node from the newly generated super-node, generates edges, selects an edge and proceeds to the next layer. Each node-edge pair corresponds to a CP reassignment. DFS terminates when it finds an l-backward subsequence for some $1 \leq n$. The search is then completed successfully and the out-of-kilter CP at layer 1 can be reassigned. On the other hand, DFS may complete layer n without finding a backward subsequence, or it may get stuck unable to generate edges or nodes before reaching layer n. DFS then backtracks to another edge that starts at the last visited node. If none exists, it backtracks to another node at the last visited super-node. If none exists, it backtracks to the parent node of the last visited super-node. Once backtracked, DFS continues from there and repeats the process of generating and selecting super-nodes, nodes and edges up to layer n, as described above. Eventually, if no backward sequence is identified and no more backtracking is possible, DFS terminates without finding a backward sequence that starts with CP $p_1$.

The nodes generated by DFS at each super-node are limited to those that are needed according to propositions 3 and 4. Also, Suppose $(p_1, i_1), (p_2, i_2), \ldots, (p_{l-1}, i_{l-1})$ are the reassignments leading to a super-node at layer l. Then, CPs $p_1, p_2, \ldots, p_{l-1}$ will be excluded from the latter super-node.

Obviously, numerous variations of the described search can be implemented. A few examples are given below. DFS may use various rules for the order in which nodes and edges are selected. DFS may continue searching for an n-backward subsequence even if the search has already found a backward subsequence with fewer reassignments. This may lead, at the expense of added computations, to finding subsequences with multiple out-of-kilter CPs that would otherwise not be found. Also, the heuristic may consider reassignment of a CP multiple times, but not more than once in the same subsequence. Although DFS is known as a convenient and efficient search scheme in a tree, other search schemes, such as breadth-first search, can be used instead.

While the invention has been described in detail above, the scope of the invention is defined by the claims below and is not limited to the embodiment above. The "means" referred to in the claims include, but are not limited to, hardware, software, and/or firmware, and any combination thereof.

We claim:

1. A method of reassigning communications paths in a communications network comprising the steps of:
   (a) analyzing a representation of a set of out-of-kilter communications paths and a representation of a set of in-kilter communications paths to generate an analysis;
   (b) generating a set of permitted changes, based upon the analysis, to both the representation of the set of out-of-kilter communications paths and the representation of the set of in-kilter communications paths; and
   (c) generating, in response to the set of permitted changes, an ordered sequence of recommended reassignments of communications paths and associating at least one out-of-kilter communications path associated with the ordered sequence of recommended reassignments with a new in-kilter communications path, wherein communications paths which are originally in-kilter are reassigned only if such reassignments make it feasible to reassign an out-of-kilter communications path.

2. A method of reassigning communications paths in a communications network comprising the steps of:
   (a) analyzing a representation of a set of out-of-kilter communications paths and a representation of a set of in-kilter communications paths to generate an analysis;
   (b) generating a set of permitted changes, based upon the analysis, to both the representation of the set of out-of-kilter communications paths and the representation of the set of in-kilter communications paths;
   (c) generating multiple backward subsequences, each backward subsequence having an out of-kilter communications path as its first reassignment; and
   (d) generating, in response to the set of backward subsequences, an ordered sequence of recommended reassignments of communications paths wherein each out-of-kilter communications path in a backward subsequence is associated with a new in-kilter communications path in the ordered sequence of recommended reassignments.

3. The method of claim 2 wherein each backward subsequence found is translated to a forward subsequence, and all forward subsequences are combined to form a single ordered sequence of recommended reassignments.

4. A device for reassigning communications paths in a communications network comprising:
   (a) means for determining subsequences of communications paths that will be reassigned onto new routes wherein each ordered subsequence comprising in-kilter communications paths and an out-of-kilter communications path;
   (b) means for determining an ordered sequence of reassignments of the communications paths that will be reassigned in an ordered subsequences; and
   (c) means for executing the reassignments in the ordered sequence of reassignments sequentially according to the order in the sequence wherein after execution all reassigned communications paths are in-kilter, each reassigned communications path is reassigned with its entire load onto a single new route, communications paths which are originally in-kilter are reassigned only if such reassignments make it feasible to reassign an out-of-kilter communications path, and none of the link capacity constraints is violated after executing each of the reassignments.

5. The device of claim 4 further comprising means for transmitting the ordered sequence of recommended reassignments.

6. A method of reassigning communications paths in a communications network comprising the steps of:
   (a) determining ordered subsequences of communications paths that will be reassigned onto new routes wherein each ordered subsequence comprising in-kilter communications paths and an out-of-kilter communications path;
   (b) determining an ordered sequence of reassignments of the communications paths in all ordered subsequences; and
   (c) executing the reassignments in the ordered sequence of reassignments sequentially according to the order in the sequence wherein after execution all reassigned communications paths are in-kilter, each reassigned communications path is reassigned with its entire load onto a single new route, communications paths which are originally in-kilter are reassigned only if such reassignments make it feasible to reassign an out-of-kilter communications path, and none of the link capacity constraints is violated after executing each of the reassignments.

7. The method of claim 6 wherein the number of reassignments in the ordered sequence of recommended reassignments is less than a predetermined number.

8. The method of claim 6 further comprising the step of generating multiple backward subsequences, each backward subsequence having an out of-kilter communications path as its first reassignment.

9. The method of claim 8 wherein each backward subsequence found is translated to a forward subsequence, and all forward subsequences are combined to form a single ordered sequence of recommended reassignments.

* * * * *